United States Patent Office 3,245,820
Patented Apr. 12, 1966

3,245,820
PREPARATION OF LONG-FLOW CARBON BLACK
Paul J. Melore, Hamilton Square, N.J., and Frank J. Eckert, Morrisville, Pa., assignors to Columbian Carbon Company, New York, N.Y., a corporation of Delaware
No Drawing. Filed Feb. 7, 1963, Ser. No. 256,807
7 Claims. (Cl. 106—307)

This application is, in part, a continuation of our copending application, Serial No. 180,835, filed March 19, 1962, and now abandoned.

This invention relates to pigmentary carbon black and, more particularly, to modified carbon black colorants especially adapted for use in the graphic arts. The invention provides improved carbon blacks characterized by a unique combination of properties by which they are especially suited for use as a black pigment in the manufacture of high quality printing inks, and the like, and especially in the compounding of lithographic inks, letterpress inks and offset printing inks and also carbon paper and typewriter ribbon inks. The invention also provides an improved process by which carbon black colorants suitable for these and other purposes may be readily and more economically produced.

The invention is directed more particularly to pigmentary carbon blacks of the type characterized as long-flow blacks. It is known that when different types of carbon black are compounded in equal proportions with an ink vehicle, linseed oil for instance, the viscosity and flow characteristics of the resultant suspensions will vary widely depending upon an inherent property of the particular carbon black used, known as flow characteristic.

In conjunction with long-flow characteristics, the improved carbon blacks of this invention are further characterized by their embodiment of other properties, including optimum color, dispersibility, mean particle diameter, surface area, surface chemistry, and absorptive and adsorptive properties, desired in ink pigments.

For many years, the ink-making art has used for these purposes certain carbon blacks produced by the well-known impingement process. Blacks of this type, which have become generally recognized by the ink-making art as "standard flow blacks," are those marketed under the registered trademarks "Peerless" and "Peerless Mark II," and produced by the incomplete combustion of natural gas by burning the gas as a multiplicity of small flames and causing the flames to impinge upon the surface of rollers or channel irons, on which the carbon black is deposited, and then subjecting the black to servere thermal oxidation.

A disadvantage associated with the use of such high color, long-flow impingement blacks, has been their relatively high cost due to the well-recognized low product yield of impingement processes, the yield of such quality pigments being usually less than one pound of carbon black per 1000 cubic feet of natural gas consumed. This problem has become increasingly serious, because of the ever increasing cost of natural gas, and extensive research has been carried on to develop a more economical source of pigmentary carbon blacks embodying the essential characteristics of the "Peerless" blacks.

It is known that carbon blacks eminently suited for use as reinforcing agents in rubber compounding can be produced in high yield by conventional furnace processes whereby a fluid hydrocarbon is introduced into a highly-heated furnace chamber and is therein thermally decomposed, at least in part, to form carbon black in gaseous suspension which is subsequently separated from the effluent furnace gases, as described, for instance, in the Heller Patents Nos. 2,768,067, 2,779,665 and 2,851,337. Especially satisfactory yields are obtained where the hydrocarbon charging stock is of a highly aromatic nature, such as the residual oil or tar obtained from petroleum or coal and now widely used for producing rubber-grade furnace blacks.

However, these so-called furnace carbon blacks, and especially those produced from aromatic oil and tars, while well suited for use in the compounding of rubber, are definitely not acceptable to the ink-making art as long-flow, high colored pigments because they do not embody the necessary characteristics.

The flow properties of carbon blacks appear to be related in some way, not fully understood, to the other characteristics, previously mentioned. The flow characteristics of such pigments are usually determined empirically, as previously noted, by mixing a given proportion or the pigment with an ink vehicle, e.g., 22 parts carbon black with 78 parts, by weight, of linseed oil, and measuring the viscosity or flow characteristics of the resultant mixture by means well-known to this art. Where the furnace blacks, and particularly the furnace blacks produced from aromatic oil or residues, are tested in this way, the black-oil mixture is found to possess characteristics which classify the black as "short" or "short-flow." The mixture is viscous and "buttery" in appearance.

In contrast therewith, the "Peerless" blacks, similarly tested, give a much less viscous mixture and are generally recognized as "long" or "long-flow" blacks.

Short fluidity is exceptionally undesirable in lithographic and offset printing inks, where the requirement is for a free-flowing formulation obtained at a high carbon black concentration in the vehicle in order to obtain good working and printing qualities, black, clear prints, stability or dispersions, and printed reproduction free from "fill-up."

Other pertinent charactertistics of the "Peerless" blacks are set forth in the following tabulation:

Table I

| | E.M. Surface Area, m.²/g. | B.E.T. Surface Area, m.²/g. | Oil Abs., Gals./100 lbs. | Tinting Strength Index | DPG Ads. | pH | Percent Volatile |
|---|---|---|---|---|---|---|---|
| Peerless | 125 | 355 | 14 | 94 | 68 | 2.8 | 12.0 |
| Peerless Mark II | 120 | 300 | 14 | 92 | 74 | 2.8 | 13.0 |

The E.M. surface area recorded in the foregoing table, and elsewhere herein, is calculated by conventional methods from the surface average particle diameter of the carbon black determined by electron microscope examination as described in "The Particle Size and Shape of Colloid Carbon as Revealed by the Electron Microscope," Columbian Colloid Carbon, vol. II (1940). The B.E.T. surface area is determined by the conventional nitrogen adsorption method. Oil absorption, tinting strength index, and pH characteristics referred to herein are determined by the methods disclosed in "The Carbon Spectrum for the Rubber Compounder," by Sweitzer and Goodrich, Rubber Age, 55, 469 (1944). DPG (diphenylguanidine) adsorption values were determined by the standard method disclosed in Columbian Colloidal Carbon, vol. 1 (1938), which also discloses a test method for determining flow characteristics of carbon blacks referred to elsewhere herein. The percent volatile is indicative of the proportion, by weight, of gases chemisorbed on the carbon black particles and is determined by the conventional method.

The corresponding characteristics of the gamut of oil furnace blacks vary over a very wide range, as shown in the following table, and those combined in a single furnace black are materially different from those of the high color, long-flow "Peerless" blacks.

*Table II*

| E.M. Surface Area, m.²/g. | B.E.T. Surface Area, m.²/g. | Oil Abs., Gals./100 lbs. | pH | Percent Volatile |
|---|---|---|---|---|
| 25-170 | 20-200 | 7-17.5 | 6.5-10 | 0.15-2.3 |

We have discovered that long-flow, high color carbon black ink pigments having properties equivalent to, and in some respects superior to, the "Peerless" carbon blacks in rheological and color properties, may be economically produced by subjecting carefully selected, short-flow, low structure furnace blacks, which may be produced in high yield from the highly aromatic residual hydrocarbons, noted above, to a controlled ozonation, as hereinafter more fully described.

As a result of this ozone treatment, the oil furnace black is converted to a new product entirely different from furnace blacks in ink compounding characteristics. When subjected to the above-described flow test, at 22% loading in linseed oil, it was found that the "litho flow" and the "litho color" were both materially increased while there was a material decrease in Laray viscosity. Also, when subjected to conventional tests, it was found that the pH value was decreased, the volatile content was increased, the iodine adsorption property was decreased and that the diphenylguanidine adsorption characteristics had materially increased.

The diphenylguanidine adsorptive characteristic of a carbon black, of particular interest with respect to rubber compounding, is also pertinent with respect to ink pigments since it has been found to be indicative of the drying properties of the ink.

As noted above, an essential feature of our process is the selection of the oil furnace black to be subjected to the ozone treatment, as otherwise the optimum combination of flow, color and strength does not result. In order to obtain the desired results in accordance with our present invention, it is essential that the furnace black selected for the treatment be one characterized by properties falling within the ranges defined in the following tabulation:

*Table III*

| E.M. Surface Area, m.²/g. | B.E.T. Surface Area, m.²/g. | Oil Abs. Gals./100 lbs. |
|---|---|---|
| 120-150 | 100-170 | 7-14 |

Further, in reference to the properties defined above, we have found that the effectiveness of the process and the quality of the final product require that the ratio of the B.E.T. surface area to E.M. surface area, expressive of the degree of porosity or roughness of the carbon black particles, be less than 1.3:1.

As indicated above, the E.M. surface area is a reflection of the mean particle diameter of the carbon black. As the mean particle diameter of the black decreases, the color development in inks increases, provided that characteristic of the black known as "structure" remains constant. The furnace carbon blacks derived from the previously mentioned highly aromatic hydrocarbons are normally characterized by high structure, i.e., a high degree of linking together of the carbon particles to form reticulate chains or clusters. Where the mean particle diameter is constant, structure development is reliably indicated by oil absorption values.

As will be apparent from the foregoing Table III, the furnace blacks selected for treatment in accordance with our present invention must be of relatively low structure. That is to say, as distinguished from the rubber-reinforcing channel blacks, which are regarded by the industry as "normal" structure blacks, and the high structure oil furnace blacks, the carbon blacks which we select for treatment, in accordance with the present invention, have a low structure or a low degree of linking together of the carbon particles in reticulate chains or clusters. The structure property of carbon black is thoroughly discussed in the paper entitled, "The Role of Carbon Structure in the Reinforcement of Rubber—Effects of Lowered Structure," Rubber Age, vol. 89, No. 2, pp. 269–282 (May 1961). The low structure furnace carbon blacks contemplated herein may advantageously be produced by known modifications of the furnace process.

Exposure of the black to atmospheric conditions prior to treatment or the absorption of atmospheric moisture therein, in amounts up to about 10% by weight, have been found not to interfere with the effectiveness of our process or to affect our product deleteriously. Normally, the moisture content of these furnace blacks will not exceed 3% which, for our purpose, has been found to be immaterial.

It is, however, essential that the carbon black be in unpelleted, powdered form through our ozone treatment and that it has not, prior to the treatment, been beaded or pelleted. It is essential that the ozone treatment be carried out in such a way as to avoid any substantial beading of the black.

Where the carbon black has been previously beaded or where the ozone treatment is carried out under condition which cause any substantial beading, a crusty surface develops on the beads, as a result of the ozonation, which prevents uniformity of treatment by interfering with the permeating of the ozone into the core of the bead and further adversely affects dispersion of the resultant black in the ink vehicle.

Our new product is characterized by long-flow properties, i.e., flow property of at least 6 inches, as determined by the conventional flow test method, carried out at room temperature, by compounding 22 parts, by weight, of the carbon black with 78 parts of pure linseed oil having a viscosity of 28 to 35 poises and an acid value of 14 to 17, and testing the mixture on a flow meter of the type described on page 181 of "What the Lithographer Should Know About Inks," by Robert F. Reed, published by Lithographic Technical Foundation Inc., New York, 1960. In these tests, the flow meter was tilted at an angle of 30° from the horizontal and the length of flow over a 15-minute period was measured in inches. In comparison with the flow characteristics of the previously-noted "Peerless Mark II" black, determined by this same method, and arbitrarily set at 100%, the flow characteristics of our product will range from about 6% to about 120%, or even higher. In terms of inches, the flow properties of our modified black will usually materially exceed 6 inches, generally falling within the range from 6 inches to about 12-13 inches.

The E.M. surface area and the B.E.T. surface area and the oil absorption characteristics of our product may be varied, depending primarily upon those characteristics of the low structure furnace black selected for treatment, very little, if any, change in those characteristics being effected by the ozonation carried on as herein described, though substantial changes have been observed in both the amount and type of volatile matter chemisorbed on the carbon black surface.

The amount of volatile matter present on the surface of our carbon black product is extremely important to the long flow, high color and other desirable characteristics which the product imparts to ink vehicles. We prefer to express volatile content of our product as grams of volatile per square meter of carbon black surface, as determined by E.M. measurement, and so expressed, it exceeds a value of $2 \times 10^{-4}$, more advantageously exceeding $2.5 \times 10^{-4}$, and ranging upwardly to a value of the order of $7 \times 10^{-4}$. This characteristic of the black is calculated from the ratio:

$$\frac{\text{Percent volatile}}{\text{E.M. surface area} \times 100}$$

As is well known, the volatile matter chemisorbed on the surface of carbon black consists largely of oxides of carbon (i.e. CO and $CO_2$) together with smaller amounts of methane, nitrogen, hydrogen and uncombined oxygen. Furthermore, when the volatile content of a typical low structure furnace carbon black is used in the practice of the present invention is analyzed by chromatographic techniques, it is found that the volatile content attributed to oxides of carbon exists mainly in the form of CO with a much smaller amount of $CO_2$ also being present. Generally the percentage of $CO_2$ in the total volatile matter of these blacks is less than about 20 percent, while the percentage of CO of the total volatile matter is greater than 60 percent.

As a result of our controlled ozone treatment the $CO_2$ component in the total volatile is greatly increased. In determining the composition of volatile content, the volatile is expelled from a dried and weighed sample of carbon black by conventional procedure at a temperature of 1750° F. and collected over mercury, the volume of the collected gas being corrected to standard temperature and pressure conditions. Analysis of the gas thus collected is carried out by standard gas chromatography techniques using a Perkin-Elmer 154–D chromatograph with a 5-foot molecular seive 5A column (18–30 mesh) for determining hydrogen, oxygen, nitrogen, methane and carbon monoxide, and a 6-inch silica gel column for determining the carbon dioxide content. The results are expressed in cc. of gaseous component per gram of carbon black, and the percentage of $CO_2$ of the total volatile matter is calculated from the ratio:

$$\frac{\text{cc./g. of } CO_2}{\text{cc/g. of total volatile}} \times 100$$

Our treated black, when subjected to the above-described test is characterized by a percentage of $CO_2$ of the total volatile of at least 30 percent and more advantageously greater than 35 percent, i.e., within the range from about 35% to about 50%. This characteristic of the black, not obtainable as a result of other treating methods conventionally used to increase the volatile content of carbon black, such as high temperature oxidation in the presence of air, or molecular oxygen, is in a large measure responsible for its highly desirable ink properties.

Thus, our carbon black product is characterized by a novel combination of properties heretofore, to our knowledge, not possessed by a carbon black, and which is responsible for the development of long-flow, high color and other desirable characteristics such as low viscosity, blue tone and low drier adsorption in ink vehicles. More particularly, the carbon black ink pigment contemplated herein is characterized by low structure, i.e., lower than the rubber-reinforcing channel blacks, an E.M. surface area of from 120 to 150 m.$^2$/g., a B.E.T. surface area of from 100 to 170 m.$^2$/g., an oil adsorption of from 7 to 14 gallons per 100 lbs., a ratio of its B.E.T. surface area to E.M. surface area of less than 1.3:1, an amount of volatile matter per square meter of carbon black surface as determined by the E.M. of greater than $2 \times 10^{-4}$ g./m$^2$. and a percentage of $CO_2$ of the total volatile matter of at least 30 percent.

The ozone treatment of the black is effected, in accordance with our present invention, by bringing an ozone-containing gas, advantageously an air-ozone mixture, into intimate contact with the powdered furnace black. This may be accomplished in various ways adapted to bring the ozone into contact with the carbon black uniformly. For instance, the ozonation may be carried out by suspending the powdered carbon black, in controlled proportions, in the gas stream or by passing the gas stream in contact with an agitated or fluidized bed of the powdered black.

We have, with advantage, effected this ozonation in a continuous manner by passing the black at a uniform predetermined rate through an elongated drum, while rotating the drum slowly, and passing an ozone-containing air stream through the drum in contact with the carbon black. In this method of operation, one may use a drum similar to the conventional tumbling drum used in pelleting carbon black, but care must be taken to avoid any substantial pelleting of the black as it passes through the drum.

As the drum rotates, the carbon black is carried upwardly and falls in contact with the gas stream which is passed through the drum at a predetermined rate and ozone concentration. Satisfactory results have been obtained by this procedure using a drum 10 feet in diameter and 30 feet long and rotating at about 1 to 2 r.p.m., the contact time between the gas stream and the carbon black in the drum being approximately one hour.

The process may be carried out more expeditiously by the first-mentioned procedure, i.e., suspending the powdered carbon black in the ozone-containing gas stream, the required contact time to obtain the desired results by this procedure usually not exceeding one minute.

The concentration of ozone in the gas stream is not particularly critical, but in no event should exceed about 6% by weight. Satisfactory results have been obtained using ozone concentrations as low as 0.4%, though even lower concentrations give noticeable changes in the characteristics of the black. The recommended ozone concentration range is from about 0.4% to about 3%, which corresponds to a range from about 0.3 pound ozone per 1000 cubic feet of air per hour up to about 2.25 pounds of ozone per 1000 cubic feet of air per hour.

While dry air is presently considered to be the most practical carrier gas of the ozone, other gases inert with respect to the ozone and to the carbon black under operating conditions may be used.

In carrying out the process in operations such as previously described herein, the ratio of carbon black to ozone may be controlled by holding the carbon black feed rate constant and adjusting the amount of ozone being supplied to the treating zone. Or conversely, the ozone supply may be maintained constant while varying the rate at which the carbon black is supplied.

A further marked practical advantage of our process is that it may be carried out at normal temperature, i.e. 70°–90° F. though somewhat elevated temperatures, not exceeding about 300° F. appear to have no detrimental effect on the product. Varying the operating temperature over a range from about 20° F. to about 200° F. gave no noticeably different results. Higher temperatures, i.e., around 300–400° F. result in a pitting of the surface of the carbon black particles.

Therefore, while it is not necessary to apply heat to the process, where it is desired to treat a freshly-produced carbon black still at an elevated temperature, it may be satisfactorily treated in accordance with our process without cooling.

As previously noted, the concentration of ozone in the carrier gas, e.g., air, is relatively unimportant, but ratios of ozone to carbon black treated therewith, very materially influence the results obtained. We have found that the ratio of carbon black to ozone should not exceed about 25:1 and more advantageously should fall within the range from about 10 parts to about 25 parts of carbon black per part of ozone, by weight. Though a modified carbon black, valuable for various purposes, results where higher ratios of carbon black to ozone are employed, we have not succeeded in producing a long flow, high color black where this ratio has exceeded about 25:1.

The time of contact between the ozone and the carbon black should be sufficient to allow thorough diffusion of the ozone through the mass or agglomerates of carbon black particles. The optimum contact time will depend largely upon the method by which the contact is effected, as we have previously noted.

The process of the present invention should not be confused with previously proposed methods of oxidation or activation whereby an organophilic carbon black is treated at an elevated temperature with oxygen or ozone to impart to it a greater or lesser degree of hydrophilic properties. While it is true that the long-flow carbon black pigments are generally hydrophilic, many of the short-flow carbon blacks, entirely unsuited for use as ink pigments, are also hydrophilic.

Our process and the effectiveness thereof will be illustrated by the following specific examples. However, the scope of our invention will be defined by the appended claims and is not limited by these illustrative examples.

EXAMPLE I

In this operation, a low structure oil furnace carbon black, having the colloidal properties indicated below, was screw fed into one end of a stainless steel drum 10 feet in diameter and 30 feet long. This drum was unheated, and was slowly rotated, i.e., at about 1–2 r.p.m., so as to avoid any substantial beading of the black.

The carbon black was continuously fed to the drum, at an ambient temperature, and discharged from the other end thereof at a rate of 29 pounds per hour, and the time period required for the carbon black to pass through the drum was approximately one hour. A gaseous mixture of dry air and ozone, also at ambient temperature, was passed through the drum in contact with the black at a rate equivalent to 1.7 pounds of ozone per hour, the ratio of carbon black to ozone fed to the treater being 17:1.

The furnace black fed to the drum was in flocculent form and had not previously been subjected to any pelleting or beading operation and, under the conditions of treatment there was no substantial formation of beads during the operation. The colloidal properties of the furnace black feed were as follows:

Table IV

Oil adsorption _____ 8.7 gal./100 lbs.
B.E.T. surface area _____ 135 m.²/g.
E.M. surface area _____ 132 m.²/g.

The colloidal properties of our resultant product, determined as previously indicated, are given in the following table, in which we have also included, for convenient reference, the corresponding properties of "Peerless Mark II," determined by identical procedure.

As may be calculated from the foregoing table, the weight of volatile matter in grams per square meter of carbon surface for our product was about $3.4 \times 10^{-4}$. When the volatile matter of our product was subjected to gas chromatographic analysis, the $CO_2$ component was found to be 11.6 cc./g. and the total of the volatile components was 32 cc./g.: thus, the percentage of $CO_2$ of the total volatile was slightly greater than 36 percent.

From the foregoing tabulation, it will be observed that the ink compounding characteristics of our product are superior to those of the "Peerless" black. More particularly, it was found to be superior to "Peerless" with respect to tinting strength index, oil absorption and DPG adsorption. When compounded with ink, it was found to develop dense, even prints and sharp half-tones. It required less vehicle in order to get a workable consistency or fluidity of the carbon black-vehicle paste than did "Peerless" and less dryer was required to equal the drying capacity of the "Peerless" black.

Though not materially different from "Peerless" in E.M. surface area, our improved product is markedly distinguished from the "Peerless" black by a vary materially lower B.E.T. surface area.

The significance of the unique combination of properties embodied in our improved high-color. long-flow carbon black pigment is reflected by the color and viscosity properties of various inks and ink vehicles with which it has been compounded. The results of comparative tests, based on the above-noted "Peerless" black as a standard, are set forth in the following table:

Table VI

| Vehicle | Carbon Loading, Percent | Property | Peerless | Our Ozonated Furnace Black |
|---|---|---|---|---|
| Isophthalic Alkyd | 28 | Color | Std | +10 |
| | | Viscosity | 100% | 45% |
| Heat-Set Ink | 22 | Color | Std | +10 |
| | | Viscosity | 100% | 15% |
| Quick-Set Ink | 22 | Color | Std | +2 |
| | | Viscosity | 100% | 20% |
| Linseed Oil | 22 | Color | Std | +20 |
| | | Viscosity | 100% | 75% |

These test results show that, in each of the various formulations, the color property of our improved pigment was superior to that of "Peerless" and that the viscosity of the composition formulated with our improved black was, in each instance, materially lower than the viscosity of the corresponding formulation produced with "Peerless" black.

The following example illustrates our process as carried out by suspending the furnace black in an ozone-containing air stream.

EXAMPLE II

In this operation, a low structure oil furnace black, having the properties indicated below, was suspended in a dry air stream containing approximately 1.03% of ozone, by weight, the ratio of carbon black to ozone being 17:1, by weight, and the resultant stream of suspension passed through two cyclone type separators connected in series. The total contact time of the carbon black in the gas stream was approximately 22 seconds.

The furnace black selected for the treatment embodied the following characteristics:

E.M. surface area, m.²/g. _____ 128
B.E.T. surface area, m.²/g. _____ 120
Oil absorption, gals./100 lbs. _____ 10.2

Table V

| | E.M. Surface Area, m.²/g. | B.E.T. Surface Area, m.²/g. | Oil Abs., Gals./100 lbs. | Tinting Strength Index | DPG Ads. | pH | Percent Volatile |
|---|---|---|---|---|---|---|---|
| Our Product | 132 | 135 | 9 | 100 | 38 | 2.1 | 4.5 |
| Peerless Mark II | 120 | 300 | 14 | 92 | 74 | 2.8 | 13 |

The treated product was characterized by essentially the same E.M. surface area, B.E.T. surface area and oil absorption properties as the starting material, and was further characterized by about $2.9 \times 10^{-4}$ grams of volatile matter per square meter of carbon black surface and a percentage of $CO_2$ component of the total volatile in excess of 40%.

The treated black was tested in ink vehicles, as described in the preceding example, in comparison with "Peerless" black in color, viscosity and flow properties. The results of these tests, as compared to "Peerless" as a standard, together with carbon black loading and identity of the vehicle, are set forth in the following tabulation:

*Table VII*

| Vehicle | Carbon Loading, Percent | Property | Peerless | Ozonated Carbon Black |
|---|---|---|---|---|
| Isophthalic Alkyd | 28 | Color | Std | +10 |
|  |  | Viscosity | 100% | 45% |
| Linseed Oil | 22 | Color | Std | +9 |
|  |  | Flow | 100% | 110% |
|  |  | Viscosity | 100% | 95% |

Because of the lower viscosity characteristics of our improved product, it is possible to formulate therewith an ink containing a higher proportion of carbon black and still obtain flow and viscosity characteristics equivalent to those obtained using lower proportions of high-quality impingement ink blacks presently used by the industry.

As previously indicated herein, the characteristics of our improved carbon black may be varied within the previously-indicated range by varying the proportion of ozone relative to the carbon black used in the treatment. This is illustrated in the following example:

EXAMPLE III

In this operation, the treatment was effected by suspending the carbon black in an ozone-containing air stream, as described in the preceding example. Nine separate runs were made using different ratios of carbon black to ozone, in each of which the characteristics of the furnace blacks subjected to treatment were as follows:

E.M. surface area, m.$^2$/g. _____ 134
B.E.T. surface area, m.$^2$/g. _____ 121
Oil absorption, gal./100 lbs. _____ 12

The product resulting from each of these runs was analyzed for volatile content and the percentage of $CO_2$ in the volatile matter, and was tested for flow characteristics by compounding with linseed oil, as previously described. The results of the volatile analysis and also the results of the ink tests, relative to those obtained by identical procedure using "Peerless" carbon black, are set forth in the following table:

For comparative purposes, the color characteristic of "Peerless" has been arbitrarily set at zero and the flow characteristics of "Peerless" arbitrarily set at 100%.

Also, to illustrate the importance of the herein prescribed range of ratios of carbon black to ozone, we have included in these runs some ratios falling without our prescribed range. Thus with carbon black/ozone ratios of 30:1, 40:1 and 50:1, the development of desired ink-compounding characteristics in the black was not obtained. With carbon black/ozone ratios of less than 10:1, markedly improved color and flow properties were obtained, but the use of such low ratios, i.e., lower than 10:1, have been found not to be commercially feasible under present conditions. At ratios of 25:1, results closely approximating those shown in the foregoing table for 20:1 ratio were obtained.

As is evident from the foregoing test results, by varying the carbon black/ozone ratio, we may obtain various degrees of modification of the selected furnace black and thereby, in conjunction with judicious selection of the furnace black, obtain an entire spectrum of ink pigments differing in flow and color properties to meet special requirements.

The values herein referred to as Laray viscosity were determined by the method described in "American Ink Maker," volume 39, No. 4, page 24, applied to the same paste used in determining flow characteristics.

We claim:
1. Method for producing a long flow, high color carbon black from an oil furnace black which comprises intimately contacting an ozone-containing gas stream with a low structure oil furnace black at a temperature below about 300° F. which embodies the following characteristics within the indicated ranges:

E.M. surface area _____ 120–150 m.$^2$/g.
B.E.T. surface area _____ 100–170 m.$^2$/g.
Oil absorption _____ 7–14 gal./100 lbs.

the ratio of B.E.T. surface area to E.M. surface area of said oil furnace black not exceeding 1.3:1, the furnace carbon black so trated being in unpelleted form and the process being carried out so as to avoid any substantial pelleting of the black during the treatment, and the ratio of carbon black to ozone, by weight, not exceeding about 25:1 to obtain a carbon black having a volatile content in an amount of at least $2 \times 10^{-4}$ grams of volatile matter per square meter of carbon black surface, as determined by the election microscope method, the volatile matter of the black being characterized by a percentage of $CO_2$ component of at least 30% of the total volatile.

2. The process of claim 1, wherein the ratio of carbon black to ozone is within the range of from about 10:1 to about 25:1.

3. The process of claim 1, wherein the ozonation of the carbon black is effected by suspending the black in an ozone-containing air stream.

4. The process of claim 1, wherein the ozonation is

*Table VIII*

| Carbon Black/ Ozone Treating Ratio | Percent Volatile | g. Vol./sq. Meter of Surface | Percent $CO_2$ in Vol. | Color | Percent Flow | Nature of Product |
|---|---|---|---|---|---|---|
| Control | 1.9 | $1.4 \times 10^{-4}$ | 20 | −68 | 0 | No flow. Poor color. |
| 50/1 | 2.6 | $1.9 \times 10^{-4}$ | 22 | −63 | 0 |  |
| 40/1 | 2.8 | $2.0 \times 10^{-4}$ | 23 | −60 | 8 | Grey tone and viscous, buttery dispersion. |
| 30/1 | 3.1 | $2.3 \times 10^{-4}$ | 26 | −50 | 26 |  |
| 20/1 | 3.5 | $2.6 \times 10^{-4}$ | 35 | −15 | 91 | Slightly blue tone and good flow. |
| 17/1 | 3.8 | $2.8 \times 10^{-4}$ | 38 | +7 | 116 |  |
| 12/1 | 4.6 | $3.4 \times 10^{-4}$ | 40 | +10 | 120 | Flow characteristics and blue tone much better than Peerless. |
| 10/1 | 5.4 | $4.0 \times 10^{-4}$ | 42 | +10 | 116 |  |
| 7/1 | 6.6 | $4.9 \times 10^{-4}$ | 44 | +15 | 120 |  |
| 5/1 | 7.1 | $5.3 \times 10^{-4}$ | 45 | +15 | 122 |  | effected by passing an ozone-containing air stream in contact with an agitated bed of the black.

5. The process of claim 2, wherein the ratio of carbon black to ozone is about 17:1 by weight.

6. The process of claim 1, wherein the ozonation is effected at a temperature within the range of 70° to 90° F.

7. The process of claim 1 wherein the ozonation is effected at a temperature within the range of 20° F. to 200° F.

References Cited by the Examiner

UNITED STATES PATENTS

| | | | |
|---|---|---|---|
| 2,005,022 | 6/1935 | Damon | 23—209.9 |
| 2,682,448 | 6/1954 | Cines | 23—209.1 |
| 2,982,621 | 5/1961 | Jordan | 23—209.1 |
| 2,984,547 | 5/1961 | Antonsen | 23—209.1 |

MAURICE A. BRINDISI, *Primary Examiner.*